Patented Aug. 22, 1944

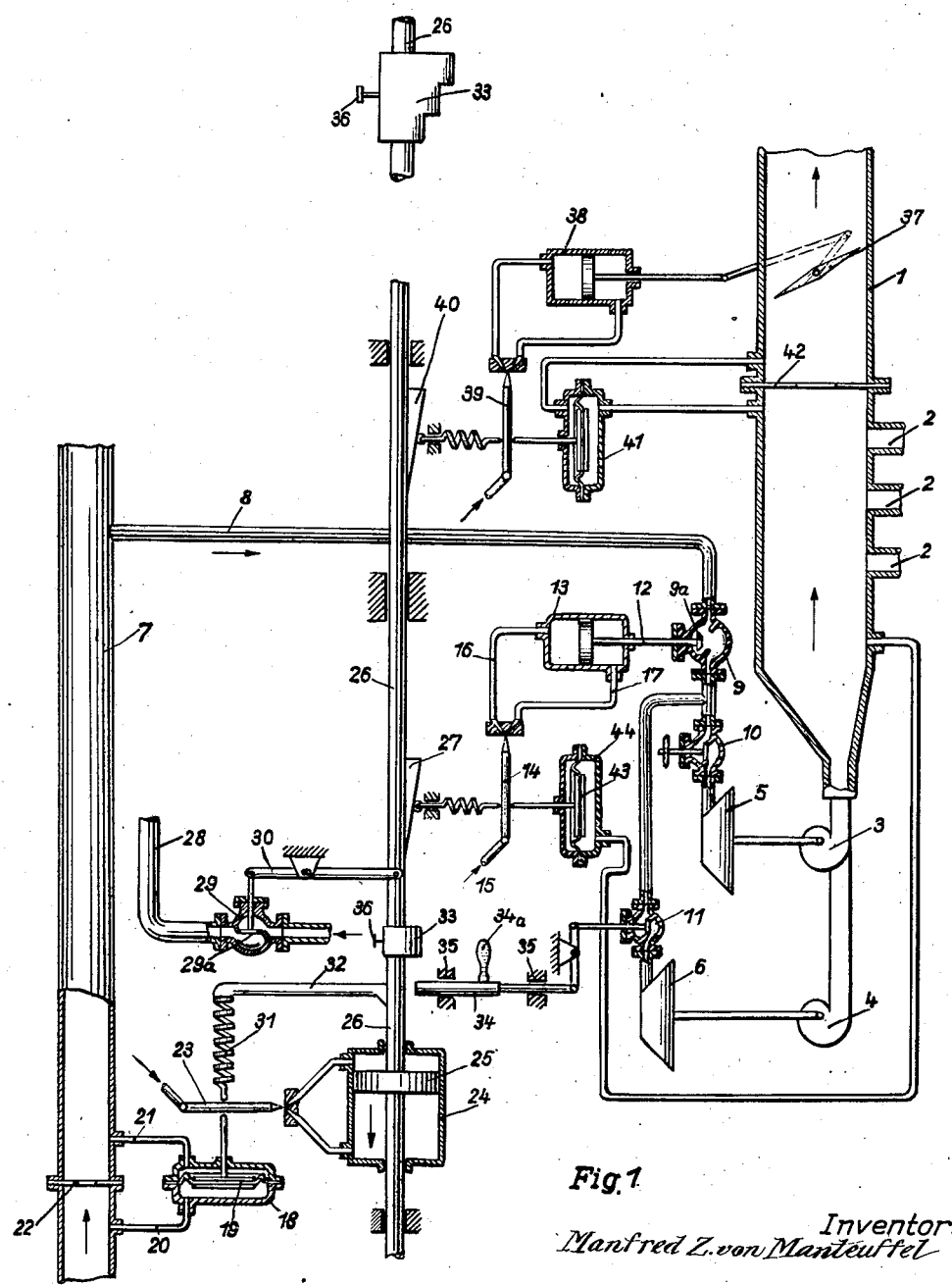

2,356,135

UNITED STATES PATENT OFFICE 2,356,135

CONTROL DEVICE FOR FURNACES

Manfred Zoege von Manteuffel, Berlin-Steglitz, Germany; vested in the Alien Property Custodian Application December 11, 1940, Serial No. 369,686
In Germany December 30, 1939

6 Claims. (Cl. 236—25)

My invention relates to improvements in devices for controlling the fuel feed and the supply of combustion air to a furnace, more particularly to a boiler furnace of the type in which any convenient combustion air supply means, such as fans, blowers or the like, are provided for supplying combustion air to the furnace.

In the event of a furnace operating with a load which is reduced—not in the course of the usual load fluctuations—but which remains reduced during a considerable working period, I prefer to correspondingly reduce the performance of the air supply means for the duration of such working period with a view to rendering the working more economical. If two or more fans are provided for supplying air to the furnace, I desire to render inoperative a part of the fans as soon as the performance of the fans remaining in operation is sufficient to supply the combustion air amount reduced corresponding to the reduced load, i. e., corresponding to the reduced fuel feed. At very small loads, at which the natural draught suffices for supplying the combustion air to the fans, all fans or blowers may be rendered inoperative which results in saving of energy for driving the fans.

Such limitation of the air suppy performance should be provided independently of the automatic controlling operation of the air supply in response to the furnace load and the furnace load variation. The danger therefore exists of the load responsive fuel feed exceeding the value at which the reduced air supply is adequate.

The main object of my invention is to provide means for eliminating this danger.

Other aims, objects and advantages of my invention will be fully apparent from the following description of one embodiment of the invention as shown in the drawing by way of example only. In the drawing, Fig. 1 schematically represents the essential parts of a controlling device of the kind referred to with parts broken away and shown in section, and Fig. 2 shows a modified form of stop member usable therein.

Referring now to the drawing, the combustion air is supplied to the furnace (not shown) through a conduit 1 having one or more orifices 2 for admitting an air flow produced by the natural draught. This draught is however inadequate for medium or greater furnace loads and therefore two fans 3 and 4 are provided for supplying combustion air through the conduit 1 to to the furnace. Each of said fans 3 and 4 is driven by means of a steam turbine 5, 6, respectively. From a main steam conduit 7 a branch conduit 8 leads to the turbines 5 and 6. A valve 9 inserted in the branch conduit 8 controls the steam supply to the turbines 5 and 6 in accordance with the boiler load or the furnace load in the manner to be described later on. Beyond the valve 9 a valve 10 is provided for shutting off the steam supply to the turbine 5, whilst a valve 11 is provided for shutting off the steam supply to the turbine 6, so that one of the two fans 3 or 4 may be rendered inoperative. Moreover both the valves 10 and 11 may be closed for rendering both fans 3 and 4 inoperative in the event of the natural draught being sufficient for supplying the combustion air required for a very small furnace load.

The means for controlling the valve 9 in response to the boiler or furnace load are described in the following:

The movable valve member 9a of the valve 9 is connected to the piston rod 12 of a servo-motor 13 controlled in a well known manner by a jet pipe relay 14, the jet pipe of which is supplied at 15 with a pressure medium, for instance compressed air or oil. In the middle or neutral position of the jet pipe 14 as shown the pressures in the conduits 16 and 17 leading to both sides of the servo-motor 13 are equal, whilst a pressure difference in one or the other direction will be produced by deflecting the jet pipe 14 from its middle position to the right or left. If for instance the jet pipe is deflected clockwise, the pressure in the conduit 17 will exceed that in the conduit 16 causing the piston to further open the valve member 9a.

For controlling the jet pipe 14 in response to the furnace or the boiler load, an impulse system is provided, shown to be a diaphragm system 18 having a diaphragm 19 dividing the diaphragm casing into two chambers, the lower chamber communicating by means of a conduit 20 with the main steam conduit 7 in front of an orifice plate 22 whilst the upper chamber communicates with the conduit 7 beyond said orifice plate 22 by means of a conduit 21. Accordingly the diaphragm 19 is acted upon by the pressure drop beyond 22, this pressure drop being a function of the rate of flow through the conduit 7 and thus a function of the boiler load and the furnace load. The diaphragm system 18 described may be arranged so as to act directly upon the jet pipe 14. In the embodiment shown, however, the load impulse produced by this system acts directly on another jet pipe relay 23 for controlling a main servo-motor 24, the piston 25 of which is connected to a piston rod 26 for controlling not only the jet pipe 14 by means of a cam 27 fastened to the rod 26, but for likewise controlling the fuel feed in response to the boiler or furnace load.

In this respect it is to be noted that in the embodiment shown a fuel control valve 29 is inserted in a fuel feed conduit 28 leading to the burners (not shown) in the boiler furnace, the movable valve member 29a of the valve 29 being linked to one arm of a double armed lever 30, the other arm of which is pivotally connected to the piston rod 26 so that upon an upward movement of this rod i. e. in a direction opposite to that shown by the arrow in Fig. 1 the valve member 29a will be further closed and vice versa. At the same time the jet pipe 14 will be deflected counter-clockwise thereby causing the servo-motor 13 to further close valve member 9a, i. e., to reduce the performance of the turbines 5, 6 and thus the air supply performance of the fans 3, 4.

The jet pipe relay 23 comprises a well known restoring system having a counter-spring 31 acting on the jet pipe 23 in opposition to the diaphragm 19. This spring rests against an arm 32 fastened to the piston rod 26. An upward movement of the piston 25 caused by a clockwise deflection of the jet pipe 23 results in a decrease of the tension of the spring 31, i. e., in a decrease of the counterforce exerted on the jet pipe 23, whereby it is restored to its middle or neutral position shown in the drawing.

The normal controlling operation of the device described is apparent from the above explanations. If the boiler operates during a considerable period with a load reduced by for instance 50%, either of the two fans 3 and 4 and either of the two turbines 5 and 6 will suffice for supplying the air to the furnace so that with a view to economy the steam valve 11 for the turbine 6 should be closed thereby leaving only the turbine 5 in operation.

As long as the boiler or furnace load fluctuations remain below the 50% value, the operation of the controlling device remains unchanged. Upon a decrease in the load the piston 25 is displaced in the direction opposite to the arrow in Fig. 1 and thus moves the valve 29 so as to reduce the fuel feed to about the 50% value referred to above, whilst the valve 9 releases the steam supply to the turbine 5 corresponding to the full performance of this turbine, i. e., half the performance of both turbines 5 and 6.

Now if the load exceeds said 50% value, the piston 25 will be displaced downwardly, i. e. in the direction of the arrow in Fig. 1, thereby increasing the fuel feed by further opening the valve 29. In the same way a downward movement of the piston 25 results in a further opening of the valve 9 without, however, increasing the air supply, it being understood that the turbine 5 already operates with full performance so that it cannot sufficiently increase the air supply in accordance with the increased fuel feed.

According to my invention I provide means to limit the fuel feed so as to prevent—upon closing of the valve 11—the fuel feed control means from exceeding the value corresponding to the air supply of the fan 3 exclusively remaining in operation. To this end according to the embodiment shown a stop 33 is fastened to the piston rod 26 cooperating with a pawl 34 which is displaceably mounted in bearings 35 so that the pawl may be shifted into the path of the stop 33 in the position shown in the drawing. Upon extensive movement of the piston 25 in the direction of the arrow shown in Fig. 1 the stop 33 contacts the pawl 34 before the piston 25 reaches its lowest position. Accordingly the piston 25 cannot fully open the fuel control valve 29 even if the load (i. e., the pressure drop at 22) exceeds the value corresponding to the reduced air supply from the fan 3. The control position of the valve 29 at which the stop 33 contacts the pawl 34 is identical with a fuel feed adequate for the exclusive air supply by the fan 3.

In the special case referred to above in which two fans 3 and 4 are provided and the fan 4 is rendered inoperative by closing the valve 11, the stop 33 should be mounted on the piston rod 26 in such a position that the stroke of the valve member 29a reaches its middle position as soon as the stop 33 upon its upward movement contacts the pawl 34. In other words, the adjustment of the position of the stop 33 on the piston rod 26 should correspond to the reduction of the air supply performance by rendering inoperative a predetermined number of fans. Thus, as will be readily understood, the position of the stop 33 must be changed if the two fans have a different air performance or if three or more fans are provided. In this respect it is to be noted that both valves 10 and 11 may be closed for rendering inoperative both fans 3 and 4 if the air supply through the orifices 2 is sufficient, i. e., if the boiler load or the furnace load is materially reduced. In this event the stop 33 on the rod 26 must be approached (in the position of the piston 25, as shown) to the pawl 34 in order to limit the opening stroke of the valve member 29a in such a manner that the fuel feed in the contact position of the stop 33 does not exceed the materially reduced air supply value of the natural draught.

With this in view I prefer to provide means by which an adjustment of the stop 33 on the piston rod 26 is easily possible. To this end the stop 33 may according to the embodiment shown in the drawing comprise for instance a bolt 36 screwed into the stop so that after loosening of the bolt the stop may be displaced on the piston rod 26 and again locked in the desired position by tightening the bolt.

Instead of such a displacement a graded stop as shown in Fig. 2 may be used. In this event the terminal position of the piston 25 and the valve member 29a may be varied in a predetermined manner by varying the feed movement of the pawl 34; the greater the amount of feed movement, the sooner will the stop contact the pawl, or, in other words, the more the opening stroke of the valve member 29a will be reduced. For this reason a graded stop may be particularly useful if three or more fans are provided. In this event a fan may be coordinated to each of the stop grades.

Instead of adjusting the stop 33 on the rod 26 the adjustment of the terminal value may of course be achieved by adjusting the pawl 34 in the longitudinal direction of the rod.

In connection with the working of my new and useful improvement it is essential to take into consideration that the valve 11 should be reopened before or simultaneously with the withdrawal of the pawl 34 in order to avoid that the fuel feed exceeds the value limited by the pawl before the second fan 4 becomes operative once more. This may for instance be achieved by coupling the valve 11 and the pawl 34 by means of a convenient rod system as schematically shown in the drawing so that the valve 11 and the pawl 34 may be simultaneously operated by hand (see the handle 34a fastened to the pawl 34).

For the sake of completeness an additional control system for the air supply is shown in the drawing, this system comprising a butterfly valve 37 in the conduit 1 and a servo-motor 38 connected in a well known manner to actuate said valve in response to the boiler load by means of a third jet pipe relay 39 controlled by a cam 40 secured to the piston rod 26. In distinction from the control impulse produced by this cam, the jet pipe 39 is acted upon by a second impulse produced by a differential pressure system 41 in accordance with the pressure drop in the air supply conduit 1 beyond an orifice plate 42.

In a similar manner a counterimpulse is provided for the jet pipe 14 which is produced by a diaphragm 43 in a casing 44, the right chamber of which communicates with the air supply conduit 1 so that the diaphragm is acted upon by the air pressure in said conduit.

It may be pointed out that the additional air supply control system 37, 38, 39 and the means 43 and 44 are unessential as regards the subject matter of my invention and may therefore be dispensed with without effecting fundamentally the working of my improvement.

My invention is not restricted to the particular construction shown and described above, many modifications being possible to anyone skilled in the art without departing from the spirit of my invention as defined in the appended claims.

What I claim is:

1. In a device for controlling the fuel feed and the supply of combustion air to a furnace the combination comprising, fuel feed means, air supply means, means for automatically varying the air supply, means responsive to the furnace load connected to automatically actuate said air supply varying means, auxiliary means for limiting at will the performance of said air supply means, means for controlling the fuel feed, a servo-motor having a piston with a piston rod connected to actuate said fuel feed controlling means, a relay for controlling said servo-motor, said relay being actuated by said load responsive means, a stop on the piston rod of said servo-motor, and pawl means mounted so as to be displaceable into the path of said stop for limiting in accordance with the air supply limitation the stroke of the servo-motor piston increasing the fuel feed.

2. In a device for controlling the fuel feed and the supply of combustion air to a furnace the combination comprising, fuel feed means, air supply means, means for automatically varying the air supply, means responsive to the furnace load connected to automatically actuate said air supply varying means, auxiliary means for limiting at will the performance of said air supply means, means for controlling the fuel feed, a servo-motor having a piston with a piston rod connected to actuate said fuel feed controlling means, a relay for controlling said servo-motor, said relay being actuated by said load responsive means, a stop on the piston rod of said servo-motor, pawl means mounted so as to be displaceable into the path of said stop for limiting in accordance with the air supply limitation the stroke of the servo-motor piston increasing the fuel feed, and means for adjusting in a predetermined position of the servo-motor the distance between said stop and said pawl means in accordance with the desired terminal value of the limited fuel feed.

3. A device as claimed in claim 1 in which said pawl means is operatively connected to said air supply limiting means for simultaneous actuation of said pawl means and said air supply limiting means in the same sense with regard to the limitation of fuel feed and air supply.

4. A device as claimed in claim 2 in which said pawl means is arranged so as to be longitudinally adjustable on the piston rod of the servo-motor for varying at will the terminal value of the limited fuel feed.

5. A device as claimed in claim 1 in which said pawl means is graded in accordance with different desired terminal values of limited fuel feed.

6. In a device for controlling the fuel feed and the supply of combustion air to a boiler furnace the combination comprising a combustion air supply conduit, a plurality of air supply fans connected to supply air to said conduit, a plurality of steam turbines, each of said turbines driving one of said fans, a steam supply conduit leading to said turbines, a main valve in said steam supply conduit, an auxiliary valve for at least one of said turbines for shutting off the steam supply thereto without affecting the steam supply to the other turbines, means responsive to the boiler load connected to control said main valve, a relay actuated by said load responsive means, a servo-motor connected to be controlled by said relay, said motor having a piston and a piston rod, a fuel feed conduit leading to the boiler furnace, a fuel valve in said conduit operatively connected to the piston rod of said servo-motor so as to be controlled in response to the boiler load, a stop on said piston rod, and a pawl mounted to be displaceable into the path of said stop so as to limit—upon engaging said stop—the piston stroke increasing the fuel feed, said pawl being operatively connected to said auxiliary valve for closing said valve upon a displacement of said pawl into the path of said stop and for opening said valve upon a removal of the pawl from its effective position.

MANFRED ZOEGE von MANTEUFFEL.